United States Patent [19]

Svensson

[11] 4,318,655
[45] Mar. 9, 1982

[54] DEVICE FOR RAISING AND TRANSPORT OF GOODS

[75] Inventor: Gustav E. W. Svensson, Holm, Sweden

[73] Assignee: Basab Materialhantering Aktiebolag, Falkenberg, Sweden

[21] Appl. No.: 173,934

[22] PCT Filed: Apr. 2, 1979

[86] PCT No.: PCT/SE79/00080
§ 371 Date: Dec. 13, 1979
§ 102(e) Date: Dec. 13, 1979

[87] PCT Pub. No.: WO79/00936
PCT Pub. Date: Nov. 15, 1979

[30] Foreign Application Priority Data

Apr. 17, 1978 [SE] Sweden .................................. 7804292
Jul. 26, 1978 [SE] Sweden .................................. 7808150

[51] Int. Cl.³ ............................................... B60P 1/04
[52] U.S. Cl. ...................................... 414/434; 414/490
[58] Field of Search ............... 414/469, 490, 444, 445, 414/446, 434; 280/47.12, 47.19, 47.29

[56] References Cited

U.S. PATENT DOCUMENTS

| | | | |
|---|---|---|---|
| 509,054 | 11/1893 | Thomas | 414/434 X |
| 1,537,156 | 5/1925 | Baxter | 414/490 |
| 1,636,574 | 7/1927 | Perry | 414/434 X |
| 1,709,737 | 4/1929 | Perry | 414/490 |
| 1,924,885 | 8/1933 | Schreck | 414/434 |
| 2,600,577 | 6/1952 | Roe | 414/457 X |
| 3,035,727 | 5/1962 | Turner | 414/490 X |

Primary Examiner—James L. Rowland
Attorney, Agent, or Firm—Beveridge, DeGrandi and Kline

[57] ABSTRACT

A device for raising and transport of goods.

The present invention relates to a device for raising and transport of goods in the form of sacks, wood boxes, cartons, cargo flats, etc. said device comprises a wheel carried frame (1) with a handle (7).

By the present invention the design of such a device is simplified and thereby the manufacturing costs and maintenance costs are reduced and at the same time the reliability is increased.

The present invention is characterized by a lever means (9, 10) in the wheel carried frame (1) to be insertable under the goods (48) for raising of the goods (48) and to be swingable during movement of the wheel carried frame (1) in under the goods (48) to a transport position (FIG. 11), in which the lever means (9, 10) is directed in a direction opposite the direction in which the lever means (9, 10) is inserted under the goods (48), and in which position the goods (48) rests on the frame (1).

11 Claims, 11 Drawing Figures

DEVICE FOR RAISING AND TRANSPORT OF GOODS

TECHNICAL FIELD

The present invention relates to a device for raising and transport of goods in the form of sacks, wood boxes, cartons, cargo flats, etc., said device comprises a wheel carried frame with a handle.

TECHNICAL STAND POINT

In order to improve the working environment generally it is desired to facilitate the handling of goods as much as possible so that the risk of damages and overstrains in connection with such work are reduced to a minimum with the help of different aids. However many known aids of this kind are heavy, complicated and expensive.

TECHNICAL PROBLEM An object of the present invention is to accomplish an aid to facilitate raising of the goods in the form of a conventional cargo flat with goods packed in paper cartons, wood boxes, sacks or simply wrapped in some material or wholly independent and packed in paper cartons and wood boxes, sacks of paper, plastic, fabric or the same, and therefore a simpler and easier and mostly a safer transport of the goods is also an object of the present invention.

SOLUTION

This and other objects are met in accordance with the present invention by giving the above mentioned device such characteristics as a lever means provided in the wheel carried frame, said lever means is to be inserted under the goods before raising it and also is to be swingable during movement of the wheel carried frame in under the goods to a transport position, in which said lever means is directed in a direction opposite the direction in which said lever means is inserted under the goods, and the goods rests upon the frame.

ADVANTAGES

By a device according to the present invention it is much more simple than with peviously known aids to lift up a wood box on a wheel carried frame and to move around the wood box with the wheel carried frame.

Figure 1:
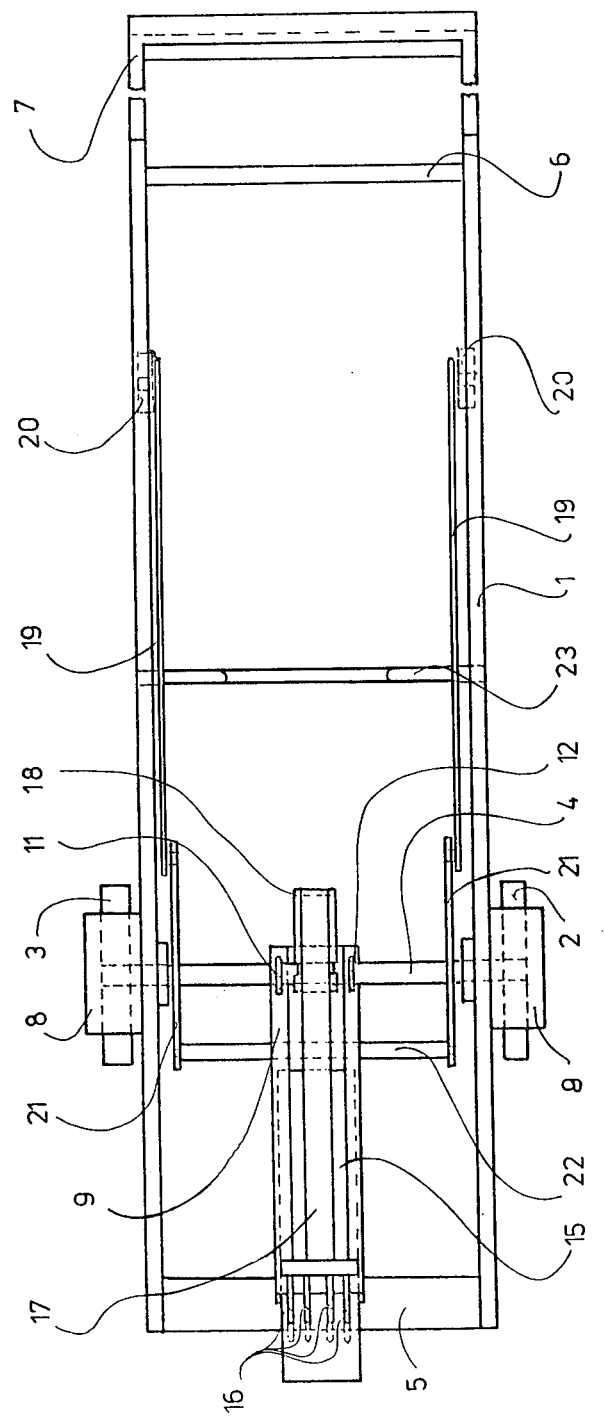
FIG. 1 shows a schematic top view of a device according to one embodiment of the present invention.
Figure 2:
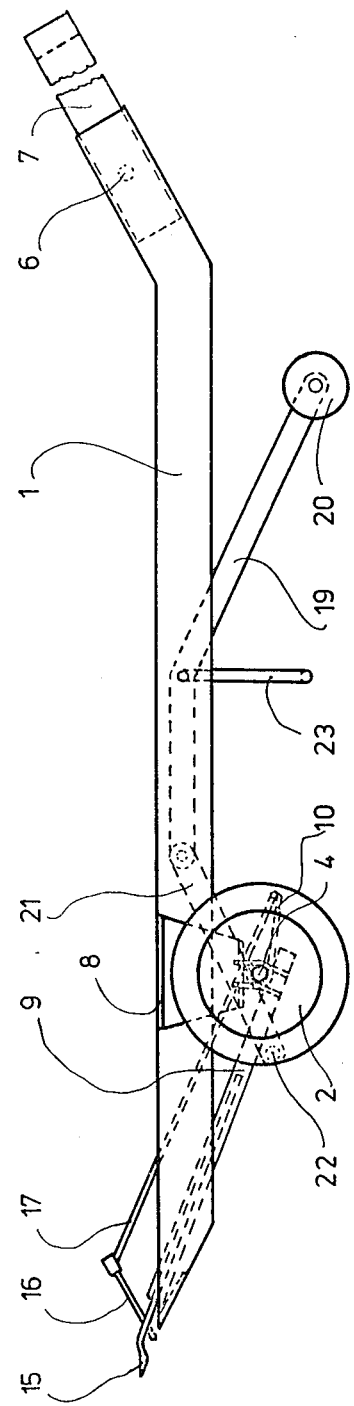
FIG. 2 shows a side view of the device in FIG. 1.

A device according to the present invention includes a wheel carried frame 1 with two wheels 2 and 3 provided on the ends of a shaft 4 fixed in the frame 1. The front end the frame has a part 5 connecting the main parts of the frame 1 and inclined in such a way that it is positioned substantially flat on the ground, on which goods to be raised and transported are placed. At the back end the frame 1 is another connection part 6, the function of which is to stiffen the frame. The main parts of the frame 1 are at the back end of the frame formed for insertion of a handle 7. A protection plate 8 is arranged above each wheel 2 and 3 in order to prevent goods from contacting and braking the wheels 2 and 3.

Figure 3:
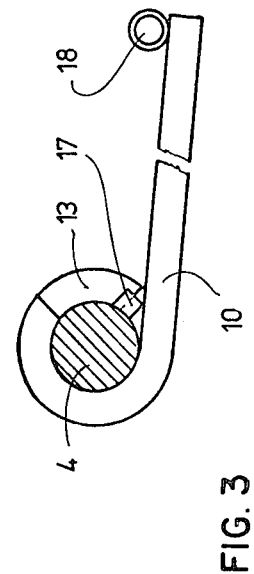
FIG. 3 shows a side view in larger scale of a part of the device in FIGS. 1 and 2.

A lever means comprises several parts and is swingable on the shaft 4. The lever means comprises two levers 9 and 10 cooperating with each other. The lever 9 is swingable on the shaft 4 by clamps 11 and 12 and in principle is unlimitedly swingable on the shaft 4 but cooperation between the lever 9 and the lever 10 limits the swingability of the lever 9 because the swingability of the lever 10 is limited by a notch 13 in the bearing sleeve of the lever 10 and a protrusion 17 on the shaft 4 (FIG. 3). The lever 9 has a telescopic insertion part 15, the front end of which is formed for insertion under a carton for raising the carton and passes the connection part 5, when the parts are in position for raising of a carton. In this embodiment the front part of the insertion part 15 shows four holes for four pins 16 providing anti-glide means for engagement with a carton to be lifted. The four pins are fixed on a swingable extension part 17 of the lever 10. The extension part 17 is swingable by a conventional hinge 18.

In the frame 1 there is also arranged a combined lever and angle arm means including two angle arms 19 swingable opposite of each other in each one main part of the frame 1. A wheel 20 is carried by the end of the angle arm closest to the ground. The wheel 20 may be in form of a roller and a roller may be arranged between the angle arms 19. The opposite end of the angle arm is swingably connected with an arm 21, the opposite ends of the arms 21 being connected to each other by a bar 22 for cooperation with the lever 9. The friction between the bar 22 and the lever 9 may be reduced by making the bar 22 as a roller rotating in connection with and movement against the lever 9. A U-formed bar 23 is arranged between the bearing points of the angle arms 19 and the ends of the bar 23 are extended against the bearing points of the angle arms 19. The swingable lever means comprising the levers 9 and 10 may rest on the bar 22. A spring may be arranged between the bar 22 and the hinge end of the lever 10 to attract these parts against each other.

PREFERRED EMBODIMENT

Figure 4:
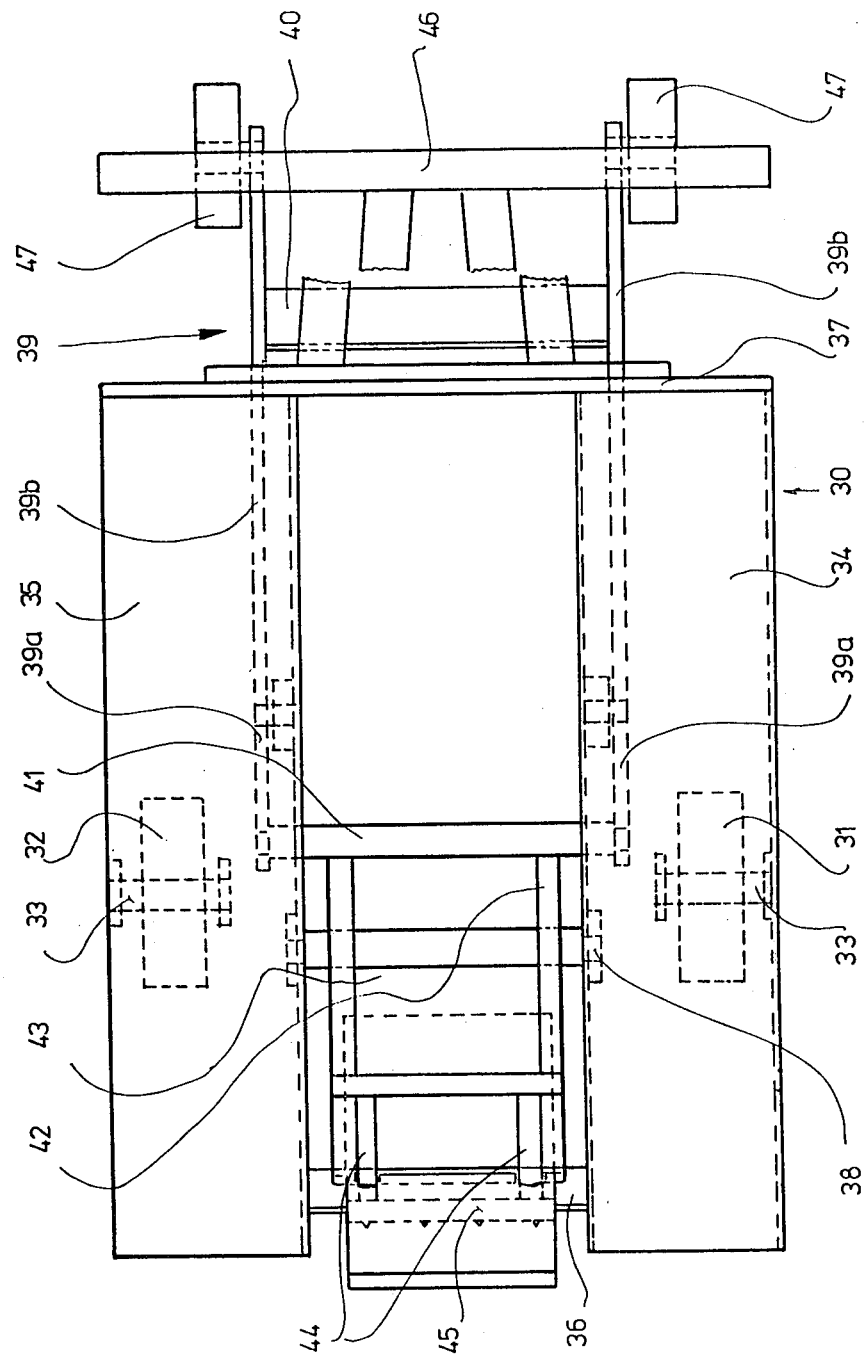
FIG. 4 shows a schematic top view of a device according to another embodiment of the present invention.
Figure 5:
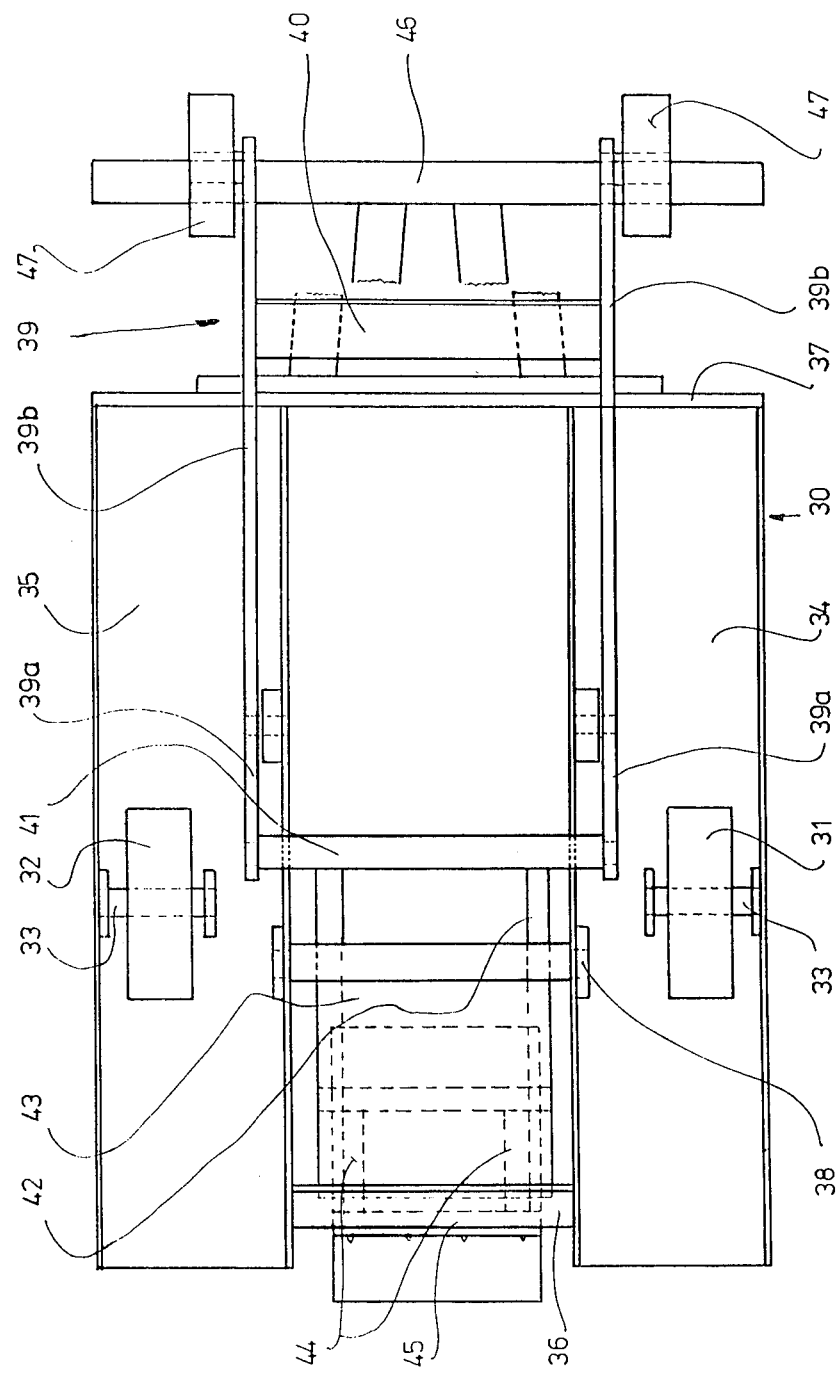
FIG. 5 shows a schematic view from the underside of the device in FIG. 4.
Figure 6:
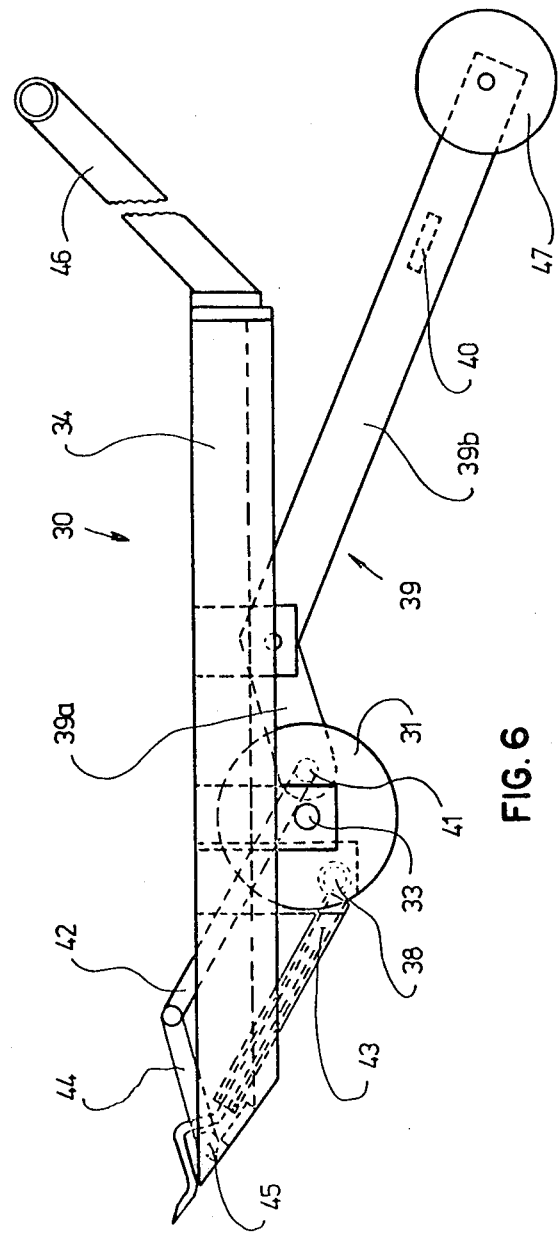
FIG. 6 shows a schematic side view of the device in FIGS. 4 and 5.

A preferred embodiment of a device according to the present invention will be described in more detail in the following by reference to FIGS. 4–6. This embodiment shows a wheel carried frame 30 with two wheels 31 and 32 on a shaft 33 each mounted in the frame. The frame 30 comprises two longitudinally substantially U-formed beams 34 and 35 connected with each other by struts 36 and 37. A shaft 38 is arranged between the beams 34 and 35. An angle arm 39 is swingable in each beam 34 and 35 and comprises a short arm 39a and a long arm 39b. The angle arm 39 swingable in the beam 34 is connected with the angle arm 39 swingable in the beam 35 by a strut 40 connecting the long arms 39b with each other and by a shaft 41 carrying a lever 42. Either the shaft 41 is freely swingable in the ends of the short arms 39a and the lever 42 is fixed on the shaft 41 or the shaft 41 is fixed in the ends of the short arms 39a and the lever 42 is freely swingable on the shaft 41.

A lever 43 is swingable on the shaft 38 and comprises two parts arranged telescopic in each other for changing the length of the lever 43. The lever 43 has one part swingable on the shaft 38 and one part telescopic in the swingable part. The end of the telescopic part is connected to the end of the arm 42. In this embodiment two pins 44 are fixed on the end of the arm 42 and extends through holes in the end of the telescopic part of the lever 43, and at the opposite side the pins are connected with each other by a friction means 45 increasing the friction grip by points or any other anti-glide means.

The device according to the present invention is provided with a handle 46 fixed to the frame 30 for handling of the device. Wheels or rollers 47 are mounted on the ends of the long angle arms 39b.

Figure 7:
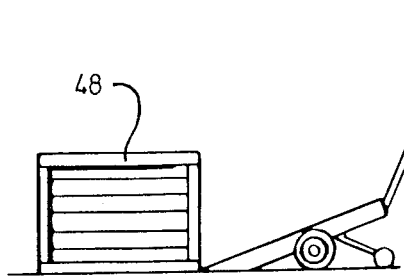
FIGS. 7-11 shows schematic side views of a device according to the present invention for disclosing the operation of the device.
Figure 8:
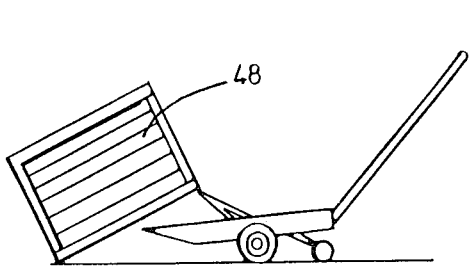
Figure 9:
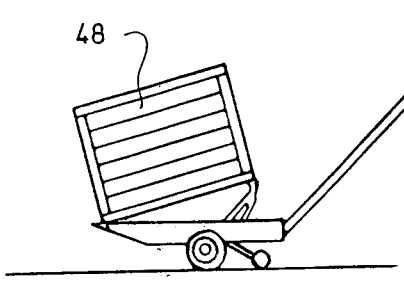
Figure 10:
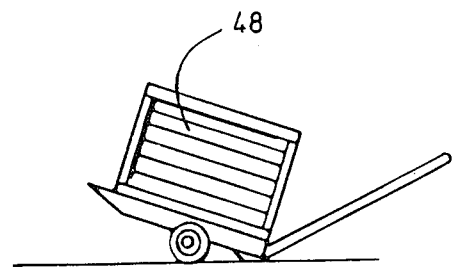
Figure 11:
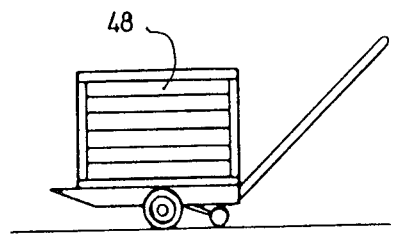

In the following the operation of the device according to the present invention will be described in more detail. This description of the operation is applicable for both embodiments. In FIG. 7 the device is shown with the parts in the position shown in FIGS. 1-6 and in position for insertion of the front end of the lever 15, 43 under a wood box 48. After insertion of the lever under the box 48 the box 48 is raised by pressing the handle 7, 46 downwards in direction to the ground for the device. The wheels or rollers 20, 47 will contact the ground and the lever 21, 42 will start swinging the lever 15, 43 to the position shown in FIG. 8 and thereafter the device is moved on the wheels in under the box 48 during continued swinging movement of the levers 15, 17, 42, 43 to the position in FIG. 9. During the swinging of the levers the friction means 16 will engage the box 48 to prevent the box from slipping off the levers, whereupon the box will rest on the frame as shown in FIG. 10 and 11. In FIG. 10 a position is shown, in which the friction means 45 is cleared from the box 48 by pressing the wheels 20, 47 upwardly against the frame 1, 30. With the box 48 and the device in the position shown in FIG. 11 the device is handled with great simplicity and it is also easy to remove the box 48 from the frame simply by inclining the frame forwardly, so that the box 48 will slip off the frame.

I claim:

1. A device for raising and transport of goods comprising a wheel-carried frame with a handle, a lever means arranged in the wheel-carried frame and insertable under the goods for raising the goods and thereafter pivotable during movement of the wheel-carried frame under the goods to a transport position, said pivotability being such that the lever means moves in a direction opposite the direction in which it is inserted under the goods, and after which the goods rest on the frame, said lever means having a first part initially insertable under the goods and a second part frictionally engageable with the goods during pivoting movement to the transport position and being arranged on a shaft for the wheels of the frame.

2. A device as claimed in claim 1, characterized in that a combined lever and angle arm means is arranged in the frame to facilitate pivoting of the lever means after raising the goods and during movement of the frame in under the goods, until the lever means will be pivoted by the weight of the goods after passage of the highest point of the lever means.

3. A device as claimed in claim 1, in which the frame has two arms on each side thereof, said combined lever and angle arm means comprises a pair of angle arms pivotably mounted, one on each side of the frame between the wheel shaft and the handle, one end of said angle arm carries a wheel or a roller and the other end carries an arm extending past the shaft, and the free ends of the arms are connected with each other by a bar for cooperation with the lever means.

4. A device as claimed in claim 1, characterized in that the lever means comprises two telescopic parts for changing the length of the lever means, said one part is pivotable in the frame and said other part is telescopic in said one part and at the free end is connected to a first lever pivotable at one end of at least one other lever pivotable in the frame.

5. A device as claimed in claim 4, characterized in that said other lever comprises a part of an angle arm, the opposite end of which carries a wheel or a roller.

6. A device as claimed in claims 4 or 5, in which an angle arm is provided pivotable at each side of the frame, the ends of said arms are connected with each other, each of the two opposite ends of said arms carries a wheel or a roller and the two opposite ends are connected with each other by a shaft, on which the first lever is pivotably mounted.

7. A device as claimed in claims 6 or 5, characterized in that the first lever is connected with said second part for positively driving of the lever means during the pivoting movement of the same.

8. A device as claimed in claim 6 characterized in that the first lever is connected with said second part for positively driving of the lever means during the pivoting movement of the same.

9. A device for raising goods off of a surface and transporting them comprising:
   a frame having a handle and a wheel rotatably mounted on said frame,
   a first lever means pivotably mounted near one of its ends on said frame and having on its other end an insertion part for initial insertion between said goods and said surface, and
   an angle arm pivotably mounted on said frame between said wheel and said handle, having a first end extending under said handle for engaging said surface and a second end engaging said lever means,
   whereby after insertion of said insertion part of said lever means between said goods and said surface, the handle can be depressed towards said surface to cause said angle arm to pivot, thereby pivoting said lever means and raising said goods, after which said device can be urged under said goods to continue the pivoting of said lever means until said goods rest on said frame.

10. A device for raising and transport of goods comprising a wheel-carried frame with a handle, a lever means arranged in the wheel-carried frame insertable under the goods for raising of the goods and thereafter pivotable during movement of the wheel-carried frame under the goods to a transport position, said pivotability being such that the lever means moves in a direction opposite the direction in which it is inserted under the goods, and after which the goods rest on the frame, said lever means having two telescopic parts for changing the length of the lever means, said one part is pivotable in said frame and said other part is telescopic in said one part and has a free end connected to a first lever pivotable at one end of at least one other lever pivotable in the frame.

11. A device as claimed in claim 10, said other lever comprising a part of an angle arm, the opposite end of which carries a wheel or a roller.

* * * * *